United States Patent
George et al.

(10) Patent No.: US 9,650,937 B1
(45) Date of Patent: May 16, 2017

(54) CONVERGING COOLING SYSTEM CROSS SECTION

(71) Applicant: Brunswick Corporation, Lake Forest, IL (US)

(72) Inventors: Trevor George, Eldorado, WI (US); Keith W. Gessner, Kewaskum, WI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 14/622,295

(22) Filed: Feb. 13, 2015

(51) Int. Cl.
| | |
|---|---|
| *F01N 13/10* | (2010.01) |
| *F01N 13/00* | (2010.01) |
| *F01N 3/04* | (2006.01) |
| *F01P 3/00* | (2006.01) |
| *F01P 5/10* | (2006.01) |
| *B63H 21/38* | (2006.01) |

(52) U.S. Cl.
CPC ......... *F01N 13/004* (2013.01); *B63H 21/383* (2013.01); *F01N 3/046* (2013.01); *F01P 3/00* (2013.01); *F01P 5/10* (2013.01); *F01P 2003/001* (2013.01)

(58) Field of Classification Search
CPC .. F01N 3/046; F01N 13/004; F01N 2260/024; F01N 2590/02; F01N 2590/022; F01P 2060/16
See application file for complete search history.

(56) References Cited

U.S. PATENT DOCUMENTS

| | | | |
|---|---|---|---|
| 5,036,804 A | 8/1991 | Shibata | |
| 5,048,467 A | 9/1991 | Kojima | |
| 5,366,401 A * | 11/1994 | Nanami | B63H 21/32 440/89 H |
| 5,873,330 A | 2/1999 | Takahashi et al. | |
| 5,904,605 A | 5/1999 | Kawasaki et al. | |
| 6,554,664 B1 * | 4/2003 | Nanami | B63H 21/383 440/88 J |
| 6,890,228 B2 | 5/2005 | Tawa et al. | |
| 6,921,306 B2 | 7/2005 | Tawa et al. | |
| 7,114,469 B1 | 10/2006 | Taylor | |
| 7,264,520 B1 | 9/2007 | Taylor et al. | |
| 7,647,901 B2 | 1/2010 | Funahashi | |
| 8,402,930 B1 * | 3/2013 | Taylor | F01P 3/202 123/41.17 |

(Continued)

*Primary Examiner* — Jonathan Matthias

(74) *Attorney, Agent, or Firm* — Andrus Intellectual Property Law, LLP

(57) ABSTRACT

A system for cooling an engine of a marine propulsion system having an engine and having a cylinder block. An exhaust manifold that conveys hot exhaust gases from the engine and a pump that pumps water from a body of water are also present in the system. A water jacket surrounding the exhaust manifold conveys water from the pump along at least one stream of water having a cross sectional area for cooling the hot exhaust gases in the exhaust manifold. At least one portion of the water jacket includes at least one converging passageway including a wall of the water jacket that tapers inwardly to reduce the cross-sectional area of the stream of water as the water circulates in the water jacket. The pumped water typically has entrained air in the form of air pockets. The converging passageway reduces the air pockets present in the water to provide even cooling of the manifold.

9 Claims, 3 Drawing Sheets

(56) References Cited

U.S. PATENT DOCUMENTS 8,783,217 B1 7/2014 Taylor et al.
2001/0039908 A1* 11/2001 Bilek ..................... F01B 1/12
114/55.5

* cited by examiner

CONVERGING COOLING SYSTEM CROSS SECTION

FIELD

The present invention is generally related to a marine engine and, more particularly, to an improved water jacket design for cooling a marine engine.

BACKGROUND AND SUMMARY

Those skilled in the art of marine engines are familiar with many different types of cooling systems and many different techniques for removing heat from various heat emitting components of marine propulsion systems. Those skilled artisans are also familiar with many important issues associated with the removal of heat from marine engines. Not only is it important to avoid the overheating of various components and devices of a marine propulsion system, but it is also very important to avoid the removal of too much heat from certain portions of the engine. This is particularly true in marine engines, as opposed to engines used to propel land vehicles, because marine engines often use water from a body of water as its primary coolant and the water taken from lakes, rivers, bays, and oceans are often significantly colder than is desirable for maintaining the best operating temperatures of certain engine components. The use of cold water can often result in the overcooling of certain portions of the engine and, as a result, the condensing of fuel vapor which can dilute the oil supply of the engine with liquid fuel. The disadvantages of oil dilution are well known to those skilled in the art of marine engines as are the various types of damage that can result from it. Other problems associated with cooling marine engines relate to the direction of cooling water as it flows through engine components. Those skilled in the art of marine engines are also familiar with the importance of the sequence with which various engine components are cooled and the shape of the engine components that carry the coolant, such as the water jacket.

U.S. Pat. No. 5,036,804, which issued to Shibata on Aug. 6, 1991, describes a cooling system for a four stroke outboard motor. The cooling system for a four cycle internal combustion engine utilized as a power plant for an outboard motor is described. The cooling system is designed so that coolant is first delivered to cool an exhaust manifold in the cylinder block, then the exhaust port is of the cylinder head and the other cylinder head components and then the cylinder block cooling jacket surrounding the cylinder bores.

U.S. Pat. No. 5,048,467, which issued to Kojima on Sep. 17, 1991, describes a water jacket arrangement for marine two cycle internal combustion engines. An outboard motor having an improved cooling system, wherein liquid coolant is circulated through an exhaust manifold cooling jacket then through a cylinder head cooling jacket and then through an upper portion of the cylinder block cooling jacket, is described. A thermostatic valve controls the flow from the upper cylinder block cooling jacket through a lower cylinder block cooling jacket so as to avoid quenching of the intake charge by coolant which has not reached operating temperature.

U.S. Pat. No. 5,873,330, which issued to Takahashi et al. on Feb. 23, 1999, describes a cooling arrangement for an engine. A cooling system for a vertically oriented engine of an outboard motor is disclosed. Coolant flows through the coolant system from a coolant pump into a coolant jacket surrounding an exhaust manifold of the engine, down to a bottom of a cylinder head of the engine, through a cylinder head, an engine block, through a thermostat, and then to a jacket positioned along an exhaust pipe leading from the exhaust manifold, to a coolant discharge.

U.S. Pat. No. 5,904,605, which issued to Kawasaki et al. on May 18, 1999, describes a cooling apparatus for an outboard motor. The outboard motor is provided with a water cooled engine in a vertical alignment in which a crankshaft is vertically disposed, the engine being composed of a cylinder block, a cylinder head and an exhaust manifold into which water jackets are formed respectively and the water jackets are supplied with cooling water from a water pump disposed below the engine, the cooling apparatus comprising a cylinder cooling water passage for supplying cooling water from the water pump to the water jackets of the cylinder block and the cylinder head. It also comprises an exhaust cooling water passage for supplying cooling water from the water pump to the water jacket of the exhaust manifold, the cylinder cooling water passage and the exhaust cooling water passage being independently disposed from each other and being joined together at downstream portions thereof.

U.S. Pat. No. 6,890,228, which issued to Tawa et al. on May 10, 2005, describes an outboard motor equipped with a water cooled engine. It includes an exhaust manifold cooling water jacket for cooling an exhaust manifold for discharging to the outside exhaust gas from a combustion chamber. The manifold cooling water jacket is supplied with cooling water from a cooling water pump. A water outlet is provided in the highest part of the exhaust manifold cooling water jacket and is made to communicate with a water check outlet for confirming the circulation of cooling water due to operation of the cooling water pump.

U.S. Pat. No. 6,921,306, which issued to Tawa et al. on Jul. 26, 2005, describes a water cooled vertical engine and outboard motor equipped therewith. It includes an exhaust guide cooling water jacket and an exhaust manifold cooling water jacket which are formed in an engine compartment. It also comprises a cylinder block cooling water jacket formed in a cylinder block. Water is supplied from a cooling water pump in parallel to an upper part and a lower part of the cylinder block cooling water jacket through the exhaust guide cooling water jacket and the exhaust manifold cooling water jacket.

U.S. Pat. No. 7,114,469, which issued to Taylor on Oct. 3, 2006, discloses a cooling system for a marine propulsion engine. The system divides a flow of cooling water into first and second streams downstream of a pump. The first stream flows through a first cooling system which is controlled by a pressure sensitive valve. The second stream flows through a second cooling system which is controlled by a temperature sensitive valve.

U.S. Pat. No. 7,264,520, which issued to Taylor et al. on Sep. 4, 2007, discloses a cooling system for an outboard motor having both open and closed loop portions. The system pumps water from a body of water through certain selected portions of the outboard motor and through a heat exchanger which, in turn, comprises a coolant conduit that is directed to conduct the coolant in thermal communication with various portions of the outboard motor. The engine block is cooled by a flow of the coolant and an engine head is cooled by a flow of water from the body of water. Other head emitting devices are connected in thermal and fluid communication with the water and coolant conduits.

U.S. Pat. No. 7,318,396, which issued to Belter et al. on Jan. 15, 2008, discloses a cooling system for a marine propulsion engine. It incorporates first and second thermally responsive valves which are responsive to increases in temperature above first and second temperature thresholds, respectively. The two thermally responsive valves are configured in serial fluid communication with each other in a cooling system, with one thermally responsive valve being located upstream from the other.

U.S. Pat. No. 8,783,217, which issued to Taylor et. al. on Jul. 22, 2014 discloses a method and apparatus for cooling an engine of a marine propulsion engine wherein water is directed to flow in two opposing directions through the cylinder head of the engine. In certain embodiments, water is directed to flow away from the engine, from a point sequentially between the exhaust manifold and the cylinder head, in order to remove heat from the exhaust manifold without allowing that heat to raise the temperature of other portions of the engine.

The patents described above are hereby expressly incorporated by reference in the description of the present invention.

It would be beneficial if a cooling system for a marine engine could remove heat from selected portions of the engine system and avoid the entrapment of air pockets within the coolant flow that could otherwise result in the overheating of local regions of the engine system.

The present application discloses a system for cooling an engine of a marine propulsion system. The marine propulsion system generally includes an engine having a cylinder block an exhaust manifold that conveys hot exhaust gases from the engine, a pump that pumps water from a body of water in which the marine propulsion system is operating to cool the hot exhaust gases in the exhaust manifold, a water jacket surrounding the exhaust manifold, and at least one conduit on the water jacket discharging at least one stream of water for cooling the engine.

The water jacket surrounding the exhaust manifold conveys water along at least one stream having a cross sectional area for cooling the hot exhaust gases in the exhaust manifold. At least one portion of the water jacket includes at least one converging passageway where an outer wall of the water jacket tapers inwardly to reduce the cross sectional area of the stream of water as water travels from the pump to the outlet conduit. In other embodiments, the water jacket conveys water along two streams of water. The two streams of water may diverge at an entry point from the pump to the water jacket such that the streams travel in opposite directions. In this embodiment, the two streams of water may converge at the outlet conduit, or may exit at separate outlet conduits. In the embodiment where two streams exit at a first and second outlet conduit, the first and second outlet conduits may be spaced from one another such that the two water streams do not converge. In further embodiments, the water jacket may comprise at least two converging passageways. In the embodiment with two streams of water, each stream of water may include a converging passageway.

The present application further contemplates a system for cooling an engine of a marine propulsion system, the system including an engine having a cylinder block and a cylinder head, an exhaust manifold that conveys hot exhaust gases from an engine, a pump, a water jacket surrounding the exhaust manifold, and at least one outlet conduit on the water jacket discharging water for cooling the engine. The pump pumps water from a body of water in which the marine propulsion system is operating to cool the exhaust gases in the exhaust manifold and to cool the engine.

The water jacket has a cross sectional area, defined in part by an inner wall and an outer wall for conveying water along at least one pathway for cooling the hot exhaust gases in the exhaust manifold. At least one section of the water jacket pathway includes a first flow portion, a second flow portion, a third flow portion and fourth flow portion. The inner wall and outer wall of the first flow portion of the water jacket are parallel. In the second flow portion, the outer wall and the inner wall diverge from parallel. In the third flow portion, the outer wall and the inner wall converge to parallel. The second and third flow portions define at least part of a converging passageway that reduces air pockets in the conveyed water. In the fourth flow portion, the inner wall and the outer wall are parallel. In one embodiment, the outer wall of the water jacket tapers inwardly to reduce the cross sectional area of the water flow pathway in the third flow portion.

Again, the water jacket may convey water along two pathways that diverge at an entry point from the pump to the water jacket, such that the streams travel in opposite directions. The pathways may converge at an outlet conduit, or may exit at a first and second outlet conduit, wherein the first and second outlet conduits are spaced from one another such that the two streams do not converge. In these embodiments, the water jacket pathway may include at least two flow sections, with each flow section having a first flow portion, a second flow portion, a third flow portion and a fourth flow portion.

In another embodiment of the present application, a water jacket for cooling and exhaust manifold that conveys hot exhaust gases from an engine in a marine propulsion system is contemplated. In this embodiment, the water jacket comprises an inlet conduit receiving water from a pump that pumps water from a body of water in which the engine is operating. The water may include entrained air in the form of air pockets or bubbles. The water jacket further comprises an outlet conduit discharging water for cooling the engine and a water flow passage extending from the inlet conduit to the outlet conduit. The water flow passage has a cross sectional area defined by an outer wall, an inner wall, a top wall and a bottom wall. The water flow passage surrounds the exhaust manifold with the water flowing through the passage to cool hot exhaust gases in the exhaust manifold. The water flow passage includes at least one section wherein the outer wall converges with the inner wall to reduce the cross sectional area of the pathway. The water jacket may comprise at least two water flow passage sections wherein the outer wall and inner wall will converge to reduce the cross sectional area along a portion of the pathway. Each water flow passage section may further comprise a first flow portion, a second flow portion, a third flow portion and a fourth flow portion. The inner wall and outer wall of the first flow portion are parallel. In the second flow portion, an outer wall diverges from parallel relative to the inner wall. In the third flow portion, an outer wall and the inner wall converge to parallel. In the fourth flow portion, the inner wall and outer wall are again parallel. The converging flow section of the water jacket reduces the air pockets present in the water to provide even cooling of the exhaust manifold.

BRIEF DESCRIPTION OF THE DRAWINGS

The present disclosure is described with reference to the following Figures. The same numbers are used throughout the Figures to reference like features and like components.

DETAILED DESCRIPTION

Figure 1:
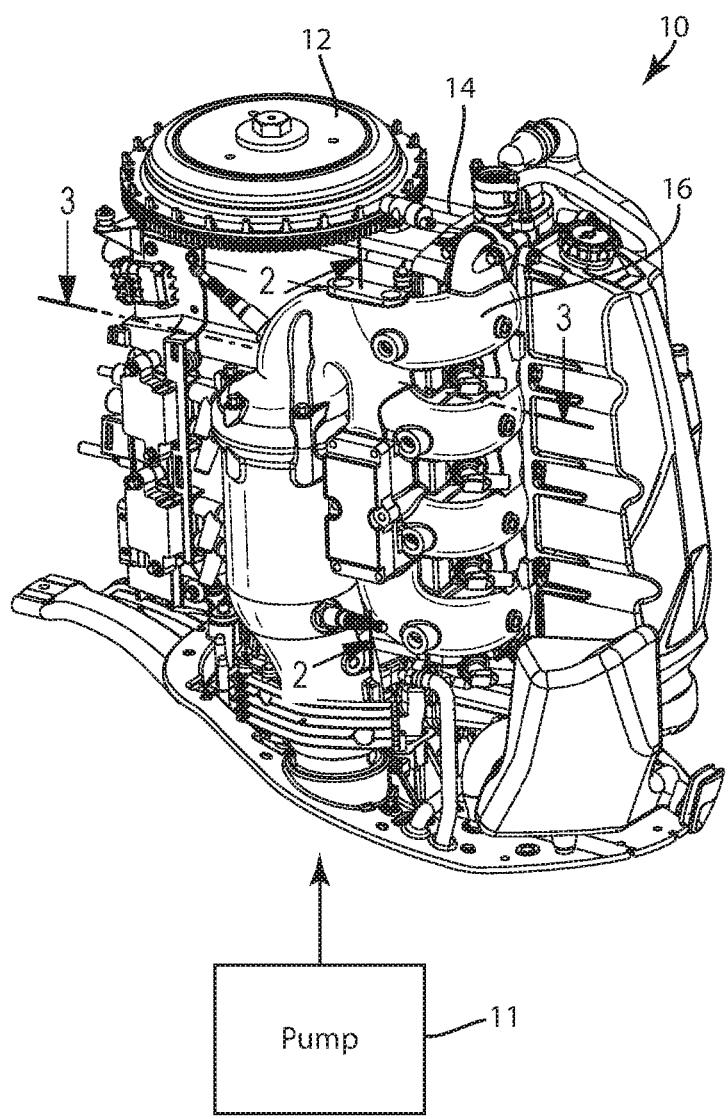
FIG. 1 is a perspective view of a marine engine demonstrating section view lines for FIGS. 2 and 3.

FIG. 1 demonstrates the conventional engine 10 that includes the system for cooling described herein. The engine 10 may be a marine engine such as an outboard engine, an inboard engine or an inboard/outboard stem drive engine. As one of ordinary skill in the art will readily understand, the invention includes conventional components such as the flywheel 12, engine block 14, and exhaust manifold 16. The system for cooling an engine of a marine propulsion system of the present application focuses on the engine block 14 and exhaust manifold 16.

Figure 2:
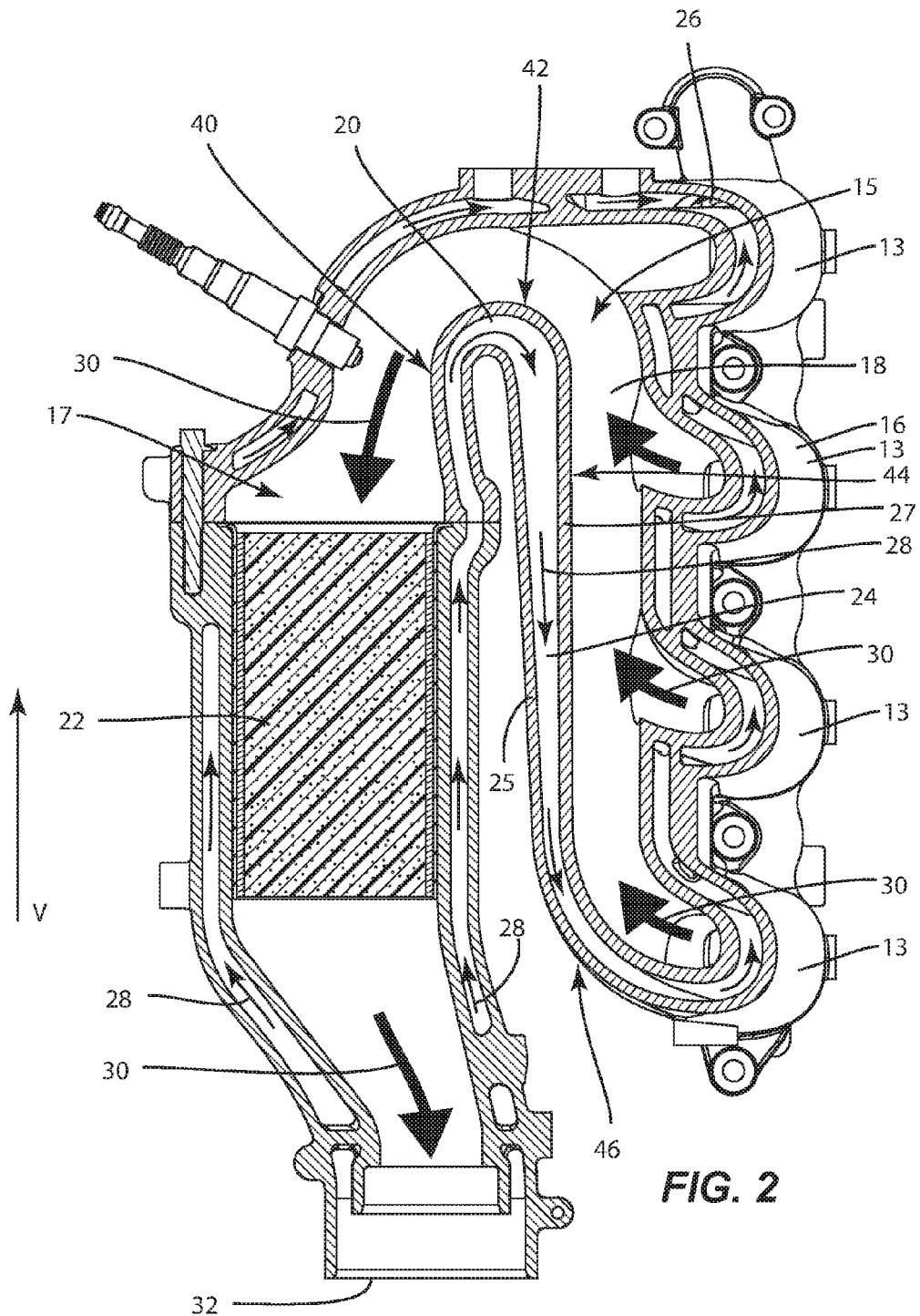
FIG. 2 is a sectional view along line 2-2 of FIG. 1 demonstrating the improved water jacket design.
Figure 3:
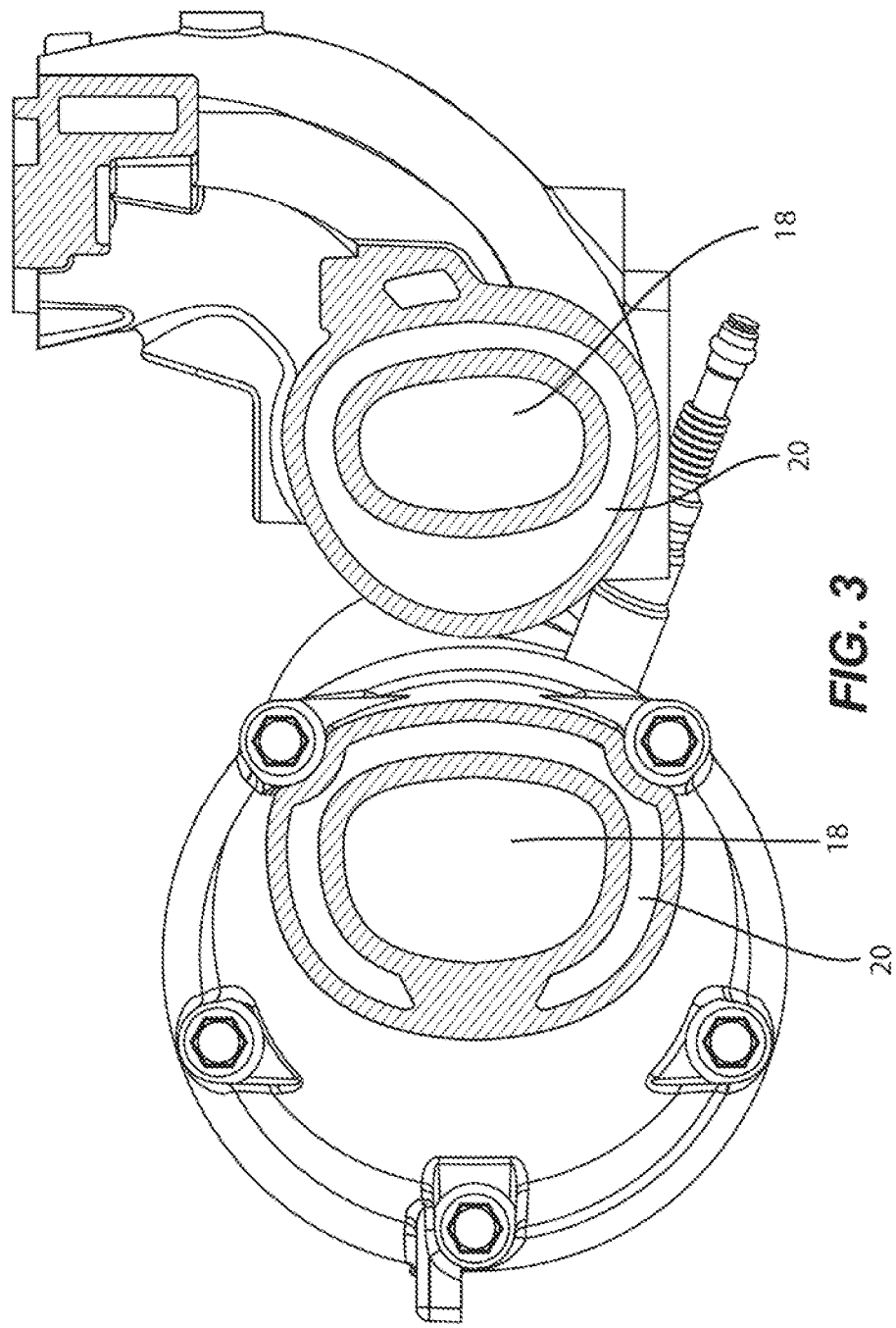
FIG. 3 is a sectional view along line 3-3 of FIG. 1 demonstrating the improved water jacket design.

Turning now to FIG. 2, therein is shown a cross section of the engine 10 along lines 2-2 of FIG. 1. FIG. 3 demonstrates a cross sectional view along line 3-3 of FIG. 1. Turning now to FIGS. 2 and 3, the exhaust manifold 16 includes a plurality of vertically-aligned exhaust runners 13 that are configured to horizontally convey the exhaust gases from the engine 10 and an exhaust passage 18 for expelling exhaust gases from the combustion of fuel in the engine. As shown in FIG. 2, exhaust gas 30 exists from the combustion chamber (not shown) into an exhaust manifold 16 and through exhaust passage 18, which includes a first exhaust passage 15 which vertically upwardly conveys the exhaust gas and a second exhaust passage 17, which vertically downwardly (see axis V) conveys the exhaust gases. The exhaust gases 30 flow through a catalyst 22 and then travel through the exhaust outlet 32.

A cooling water passage or water jacket 20 surrounds the exhaust passage 18. Water is drawn from a pump 11 that is in fluid communication with a body of water to draw water from the body of water into the water jacket 20, as is well known in the art. In FIG. 2, the water flow through the water jacket 20 is designated by flow arrows 28. The water jacket 20 is configured to cause the cooling water to flow in thermal communication with the plurality of exhaust ports, and also about exhaust manifold 16. After the water 28 flows through the water jacket 20, it is recirculated to the body of water by the pump 11. In this manner, the water jacket 20 that surrounds the exhaust manifold 16 conveys water from a body of water along at least one stream 28 of water to cool the exhaust passage 18, particularly from a vertically higher portion of the converging passageway 24 to a vertically lower portion of the converging passageway 24. The stream of water 28 has a cross sectional area that is defined by the water jacket passageway 20, as depicted in FIG. 3. The water jacket 20 includes at least one outlet conduit 26 for discharging at least one stream of water.

As best shown in FIG. 2, the water jacket 20 includes a plurality of passageways that the stream of water 28 flows through. Particularly, the engine 10 of the present invention includes a water jacket 20 including at least one converging passageway 24 that extends in a vertical direction V, the converging passageway 24 defined by an outer wall 25 and an inner wall 27. The outer wall 25 of the water jacket converging passageway 24 tapers inwardly to reduce the cross sectional area of the stream of water 28 as the water travels from the pump 11 to the outlet conduit 26.

In certain embodiments, the water jacket 20 may direct flow of water 28 along two or more streams of water, as discussed in U.S. Pat. No. 8,783,217. In the embodiments including two streams of water, the two streams may diverge at an entry point from a pump to a water jacket 20 such that the streams 28 travel in opposite directions. The streams of water 28 may then converge at the outlet conduit 26. In other embodiments, the two streams of water 28 may exit separate outlet conduits, i.e. a first stream of water may exit a first outlet conduit, while the second stream of water may exit a second outlet conduit. The first and second outlet conduits, in this embodiment, are spaced from one another such that the two streams do not converge. Further, the present application contemplates embodiments where the water jacket 20 includes at least two converging passageways 24. Indeed, the number of converging passageways are not limited, and those with skill in the art will understand that any number of converging passageways may be included in a water jacket design, subject to the caveat that the water jacket must still operate to cool the flow of exhaust gases 30. Accordingly, in certain embodiments contemplated by the present application, the water jacket 20 may include at least two converging passageways 24 in two streams of water 28 that diverge at an entry point from the pump to the water jacket 20, with the streams 28 traveling in opposite directions.

As described above, and as shown in the figures, at least one section of the water jacket 20 includes a water jacket pathway including a first flow portion 40, a second flow portion 42, a third flow portion 44, and a fourth flow portion 46. In the first flow portion 40, the outer wall 25 and inner wall 27 are parallel with one another. In the second flow portion 42, the outer wall 25 diverges from parallel relative to the inner wall 27, beginning the converging passageway 24. Alternatively, the inner wall 27 may diverge from parallel relative to the outer wall 25. In the third flow portion 44, the outer wall 25 converges to parallel relative to the inner wall 27. Alternatively, the inner wall 27 may converge with the outer wall 25. The third flow portion 44 defines the majority of the converging passageway 24. In both the second flow portion 42 and the third flow portion 44, the converging passageway 24 is created when outer wall 25 and inner wall 27 first diverge from parallel and then converge to parallel. When the outer wall 25 and inner wall 27 are again parallel, the fourth flow portion 46 begins, and the converging passageway ends. In this manner, a wall 25, 27 of the water jacket 20 tapers inwardly to reduce the cross sectional area of the converging pathway 24 in the third flow portion 44. Again, the water jacket 20 may include multiple recurrences of the first through fourth passageways, to define multiple converging passageways 24.

One of ordinary skill in the art will understand that the water flow passage 20 extending from the inlet conduit to the outlet conduit 26 will have a cross sectional area defined by an outer wall 25, an inner wall 27, and also a top and bottom wall. The water flow passage 20 surrounding the exhaust manifold 16, when designed in accordance with the present application, will include at least one section wherein the outer wall 25 and the inner wall 27 converge to reduce the cross sectional area of the pathway 20.

An advantage of this converging passageway 24 is that by including either an outer wall 25 or inner wall 27 that is generally converging, many diverging cross sections present due to a constantly changing opposite wall are reduced. With the extended converging passageway 24 of the present application, any air pockets present in the stream of water 28 will exit either by buoyancy or drag due to velocity. The air pockets present in the stream of water 28 create undesirable local hot spots due to severe reduction in the heat transfer coefficient. Thus, diverging cross sections and relatively constant cross sections provide multiple locations where air pockets may become trapped, creating hot spots. By incorporating at least one converging passageway 24 within the water jacket, these potentially detrimental air pockets can escape rapidly through the outlet conduit 26.

The present disclosure thus provides a system for cooling a marine engine 10 having a cylinder block 14. The system includes an exhaust manifold 16 that is configured to convey exhaust gases from the engine 10. The exhaust manifold 16 includes a plurality of vertically aligned exhaust runners 13 configured to horizontally convey the exhaust gases from the engine 10. A first exhaust passage 15 is configured to vertically upwardly convey the exhaust gases from the exhaust runners 13. A cooling water jacket 20 is disposed on the exhaust manifold 16 and is configured to convey the cooling water along side and in thermal communication with the exhaust manifold 16. A cooling water pump 11 is configured to pump the cooling water through the cooling water jacket 20 and particularly vertically downwardly along side the first exhaust passage 15 (see axis V). Alongside the first exhaust passage 15, the cooling water jacket 20 defines a converging passageway 24 that converges from a vertically higher portion to a vertically lower portion (reference axis V) so that as the cooling water flows vertically downwardly through the converging passageway 24, air pockets within the cooling water tend to exit the cooling water via buoyancy or drag due to flow velocity.

In the preceding description, certain terms have been used for brevity, clearness and understanding. No unnecessary limitations are to be implied therefrom beyond the prior art because such terms are used for descriptive purposes only and are intended to be broadly construed. The different embodiments and apparatuses described herein may be used alone or in combination with other systems and methods. Various equivalents, alternatives and modifications are possible within the scope of the appended claims.

What is claimed is:

1. An outboard marine engine comprising:
an engine having a cylinder block having a plurality of vertically-aligned cylinders;
an exhaust manifold configured to convey exhaust gases from the engine, wherein the exhaust manifold comprises a plurality of vertically-aligned exhaust runners configured to horizontally convey the exhaust gases from the engine, and a first exhaust passage configured to vertically upwardly convey the exhaust gases from the plurality of vertically-aligned exhaust runners;
a cooling water jacket on the exhaust manifold, the cooling water jacket being configured to convey cooling water alongside and in thermal communication with the exhaust manifold; and
a cooling water pump configured to pump the cooling water through the cooling water jacket and particularly vertically downwardly alongside the first exhaust passage;
wherein alongside the first exhaust passage, the cooling water jacket defines a converging passageway that converges from a vertically higher portion to a vertically lower portion so that as the cooling water flows vertically downwardly through the converging passageway, air pockets within the cooling water tend to exit the cooling water via buoyancy or and drag due to flow velocity.

2. The outboard marine engine according to claim 1, wherein the exhaust manifold further comprises a second exhaust passage configured to vertically downwardly convey the exhaust gases from the first exhaust passage, wherein the cooling water pump is configured to pump the cooling water vertically upwardly in the water jacket alongside the second exhaust passage and then vertically downwardly in the water jacket alongside the first exhaust passage.

3. The outboard marine engine according to claim 2, further comprising a catalyst disposed in the second exhaust passage and configured to treat the exhaust gases being conveyed through the second exhaust passage.

4. The outboard marine engine according to claim 1, wherein the cooling water jacket comprises an outlet conduit configured to discharge cooling water from the cooling water jacket.

5. The outboard marine engine according to claim 1, wherein the converging passageway is defined by an outer wall of the cooling water jacket and an inner wall of the first exhaust passage.

6. The outboard marine engine according to claim 5, wherein the outer wall tapers inwardly from the vertically upper portion to the vertically lower portion so as to reduce a cross-sectional area of the cooling water as the cooling water flows through the converging passageway.

7. The outboard marine engine according to claim 1, wherein the converging passageway is configured to evenly cool of the exhaust manifold by reducing air pockets in the cooling water.

8. An outboard marine engine comprising:
an engine having a plurality of vertically-aligned cylinders;
an exhaust manifold that conveys exhaust gases from the engine;
a cooling water jacket on the exhaust manifold that receives cooling water from a body of water in which the outboard marine engine is operating and conveys the cooling water alongside the exhaust manifold to thereby cool the exhaust gases conveyed by the exhaust manifold;
wherein the cooling water jacket comprises a wall that converges radially inwardly towards the exhaust manifold in a vertically downward direction to thereby define a reduced cross-sectional area between the cooling water jacket and the exhaust manifold;
a cooling water pump configured to pump the cooling water through the cooling water jacket and particularly vertically downwardly through the reduced cross-sectional area during operation of the engine;
wherein as the cooling water is conveyed vertically downwardly through the reduced cross-sectional area, air pockets within the cooling water tend to exit the cooling water via buoyancy or and drag due to flow velocity.

9. An outboard marine engine comprising:
an engine having a cylinder block having a plurality of vertically-aligned cylinders;
an exhaust manifold configured to convey exhaust gases from the engine, wherein the exhaust manifold comprises a plurality of vertically-aligned exhaust runners configured to horizontally convey the exhaust gases from the engine, and a first exhaust passage configured to vertically upwardly convey the exhaust gases from the plurality of vertically-aligned exhaust runners;
a cooling water jacket on the exhaust manifold, the cooling water jacket being configured to convey cooling water alongside and in thermal communication with the exhaust manifold; and
a cooling water pump configured to pump the cooling water through the cooling water jacket and particularly vertically downwardly alongside the first exhaust passage;

wherein alongside the first exhaust passage, the cooling water jacket defines a converging passageway that continuously converges from a vertically higher portion located vertically higher than the plurality of vertically-aligned exhaust runners to a vertically lower portion located vertically below an uppermost exhaust runner in the plurality of vertically-aligned exhaust runners so that as the cooling water flows vertically downwardly through the converging passageway, air pockets within the cooling water tend to exit the cooling water via buoyancy and drag due to flow velocity.

\* \* \* \* \*